Patented Nov. 10, 1942

2,301,762

UNITED STATES PATENT OFFICE 2,301,762

PREPARATION OF METAL SALTS OF ORGANIC POLYBASIC ACIDS

Sidney B. Tuwiner, Kew Gardens, and Dwight A. Dodge, Woodside, Long Island, N. Y., assignors to Phelps Dodge Corporation, New York, N. Y., a corporation of New York No Drawing. Application April 22, 1940, Serial No. 331,064

9 Claims. (Cl. 260—438)

This invention is concerned with the preparation of metal salts of polybasic organic acids and particularly with the preparation of copper phthalate, which is a blue-green colored substance suitable for use as a pigment and is valuable as a base for green or blue colored paints and enamels. It has previously been suggested to prepare copper phthalate pigments by the reaction of a phthalic anhydride with a water suspension of basic copper carbonate. However, there are certain disadvantages in the production of copper phthalate in that way.

It is an object of the present invention to provide an improved procedure for the production of copper phthalate and other copper salts. It is also an object to provide a procedure for producing copper phthalate pigments having a better color tone and that may be more easily dispersed in the usual paint vehicles. It is another object to provide a procedure whereby copper phthalate and other pigments may be produced more economically. Other objects will become apparent.

In the preparation of copper phthalate in accordance with the present invention, copper oxide is reacted with phthalic acid or phthalic anhydride in the presence of a considerable excess of the phthalic acid or phthalic anhydride. By this procedure a product may be produced that is substantially free from unreacted copper oxide which, being black, would impart an olive tone that is undesirable for most applications. The copper phthalate is separated by filtration while hot, the filtrate containing the excess phthalic acid and a certain amount of copper phthalate present in the mother liquor because of its solubility. This mother liquor is preferably used in the preparation of succeeding batches of the substances to be reacted.

The resulting copper phthalate may be heated with a soap solution, resulting in the production of a copper phthalate pigment of decreased oil absorption value, whereby more pigment may be incorporated in a given volume of liquid for a given consistency, or, for a given paint composition, better flow conditions may be obtained.

As a specific example of the improved process, about 30 pounds of finely divided black copper oxide (containing about 79.61% copper) is dispersed in about 25 gallons of the mother liquor from a previous batch (containing about 0.9 pound per gallon of phthalic acid and about 0.04 pound per gallon of copper), in a 50 gallon copper, steam jacketed kettle furnished with a propeller agitator, the blades of which are of Monel metal and the shaft of stainless steel. If desired, a portion of the wash solution from a previous operation, which preferably has been concentrated by evaporation, may also be added. This dispersion of copper oxide is heated to about 210° F. and about 47 pounds of phthalic anhydride is added thereto. The mixture is heated for approximately 3 hours, the temperature being maintained in the vicinity of 210° F. throughout most of this time. By this procedure a final product of blue green color is obtained.

In the example given above the copper oxide used was of a fineness such that 95% would pass through a screen having 325 meshes per square inch. With a coarser copper oxide reactant or with lower temperatures, a longer time would be required for the reaction.

The filter cake, after washing, may be repulped with fresh water (with or, preferably, without previous drying), and about one pound of soap (sodium stearate) in concentrated water solution (for example, 20 grams of soap per liter) may be added, preferably to the cold slurry (i. e., at about normal room temperature). The slurry may then be heated to above 100° F. for about ten minutes, after which the product is filtered and dried. The resulting product amounts to about 77 pounds of copper phthalate pigment, containing about 31% copper and having an oil absorption value of 31 cubic centimeters of alkali refined linseed oil per 100 grams of pigment.

The mother liquor recirculated in the above examples contains about 107 grams per liter of total phthalic acid and 5.11 grams per liter of copper present as acid copper phthalate and, after a sufficient amount of liquor of this concentration has been built up, the yield is substantially equal to the sum of the weights of the reactants. A less concentrated solution of mother liquor, or even water, may be used in place of the mother liquor, in which event the amounts of phthalic acid and copper oxide added should be increased accordingly to give the proper proportions of the reacting substances.

The black copper oxide often contains small amounts of impurities, particularly iron, which are accumulated in the mother liquor. If the concentration of iron in this liquor becomes too high, some iron will be precipitated in the pigment product, causing discolorization. It is, therefore, desirable to reduce the iron content of this liquor, periodically or continuously, as required. This may be done as follows:

The mother liquor may be allowed to cool to permit crystallization of excess phthalic acid and blue crystals of what appears to be an acid copper phthalate. The cool liquor is withdrawn from these crystals, placed in the kettle, and treated with sodium chlorate in about the proportion of one pound of this reagent for every pound of iron contained in the liquor. The solution may be brought to a boil and maintained for about one hour, during which the iron in the solution is oxidized to the ferric state, whereupon it hydrolyzes to a flocculent precipitate, which is probably ferric hydroxide. This may be allowed to settle and the liquor decanted, recombined with the phthalic acid and acid copper phthalate crystals, and used as mother liquor for a succeeding batch. As an example of this treatment, the iron content of 50 gallons of mother liquor may be reduced from .46 gram per liter to .0244 gram per liter.

It is obvious that many changes may be made in the above described procedure. For example, the proportions and temperatures may be varied. The phthalic anhydride or phthalic acid reacts with copper oxide in equal molecular proportions or less, but it is desirable to have a considerable excess of the phthalic acid or phthalic anhydride in the reaction mixture over the equal molecular proportions in order to assure the absence of unreacted copper oxide. The temperature is preferably maintained at 180° F. to boiling throughout the major portion of the heating time. Where the agitation is not adequate, and local overheating is likely to occur, there is a tendency for the product to discolor at the higher temperatures and to avoid this, under such conditions, it is desirable to maintain the temperature in the vicinity of 180° F. throughout the most of the heating period and to raise it to approximately the boiling point of the solution near the close of that period. In any event, the final temperature should be preferably in the vicinity of the boiling point of the mixture at normal atmospheric pressure.

Normal copper phthalate should have a copper content of 27.93%, while with our procedure the product contains copper ranging from 31 to 33% or more. The excess copper appears to be present in the form of basic copper phthalate.

In the claims reference is made to the use of the polybasic acid, since the anhydride forms the acid in aqueous solutions. However, the reaction with the anhydride may be carried out in the presence of organic solvents, such as alcohol, and it is intended to include such reactions as equivalents.

The length of time of heating may also be varied somewhat, depending upon the concentration of the reacting ingredients, the fineness of the oxide, the thoroughness of the agitation, and the temperatures and other conditions prevalent. It should be continued long enough to avoid the presence of unreacted copper oxide.

The soap treatment may be omitted if it is not required to reduce the oil absorption value, or other procedures may be followed for this purpose. In this soap treatment the slurry is conveniently heated to and maintained at above 100° F., although similar results may be obtained by using a lower temperature for a longer time. The proportions of soap used may be varied, depending upon the reduction in oil absorption value desired and the permissible conversion of copper phthalate to copper stearate and resultant reduction in pigment value. The oil absorption appears to drop with increasing amounts of soap until a constant minimum oil absorption is obtained, after which it drops slowly or not at all. The amount of sodium stearate required to give a constant minimum oil absorption is about 1.35% of the copper phthalate, but this will depend upon the fineness, etc. of the pigment. For example, with a finer pigment, more of the sodium stearate may be required.

Other soaps may be used in place of sodium stearate. For example, sodium resinate or sodium oleate, or the potassium or other soaps of the various fatty acids referred to may be used. Still other soaps may be substituted for this purpose.

Other oxidizing agents may be used in place of sodium chlorate in the treatment to remove iron. For example, hydrogen peroxide or chlorine gas may be used for this purpose. Also, metal oxidizing agents, such as potassium permanganate, may be applied, but would remove iron at the expense of introducing another metallic impurity. Such oxidizing agents may be used where the addition of such impurities is desirable or at least not objectionable.

The above description has been of the preparation of copper phthalate. The procedure described may also be applied to the preparation of other phthalates, such, for example, as phthalates of iron, nickel or cobalt, from their respective oxides. The procedure may also be used in the preparation of metallic compounds of other polybasic organic acids, such, for example, as in the preparation of copper salts of maleic, malic, succinic, citric or aconitic acids. For instance, a copper maleate may be prepared in a similar manner by reacting 30 grams of copper oxide with 60 grams of maleic acid in one liter of water while heating to about 200° F. for about one and one-half hours, with agitation. A crystalline product of dull blue green containing about 37.3% copper may be obtained after filtering, washing and drying. This compound at elevated temperatures decomposes to a deep blue violet material, with loss of water. On standing, it absorbs water from the atmosphere, returning to its hydrated form. Normal anhydrous copper maleate contains about 35.8% copper theoretically. Copper salts of the other polybasic organic acids mentioned may be prepared in a similar manner.

The terms used in describing the invention have been used in their descriptive sense and not as terms of limitation and it is intended that all equivalents of the terms used be included within the scope of the appended claims.

We claim:

1. A method of producing copper salts of polybasic organic acids comprising heating a suspension of copper oxide in a solution in liquid solvent of an excess of the polybasic acid over that required to react with all the copper oxide.

2. A method of producing copper salts of polybasic organic acids comprising heating a suspension of copper oxide in a solution in liquid solvent of the polybasic acid in mother liquor from a previous reaction of the oxide and acid containing a considerable excess of the acid, over that required to react with all the copper oxide, and a small quantity of the copper salt.

3. A method of producing copper phthalate comprising heating a suspension of copper oxide in a solution in liquid solvent of an excess of phthalic acid over that required to react with all the copper oxide.

4. A method of producing copper phthalate comprising heating black copper oxide with phthalic acid in mother liquor from a previous reaction of the copper oxide and phthalic acid containing a considerable excess of phthalic acid, over that required to react with all the copper oxide, and a small quanity of copper phthalate.

5. A method of producing copper phthalate comprising heating a suspension of black copper oxide with an excess of phthalic acid, over that required to react with all the copper oxide, in a solution in a liquid solvent at a temperature of 180° F. to the boiling point of the mixture.

6. A method of producing copper phthalate comprising heating black copper oxide with an excess of phthalic acid, over that required to react with all the copper oxide, in the presence of mother liquor from a previous reaction of the copper oxide and phthalic acid containing unreacted phthalic acid and a small quantity of copper phthalate, from which mother liquor the impurities have been removed by oxidation.

7. A method of producing copper phthalate comprising heating black copper oxide with an excess of phthalic acid, over that required to react with all the copper oxide, in the presence of mother liquor from a previous reaction of the copper oxide and phthalic acid containing unreacted phthalic acid and a small quantity of copper phthalate, separating the copper phthalate, oxidizing the mother liquor to remove impurities and reusing the purified mother liquor in a subsequent reaction.

8. A method of producing copper phthalate comprising heating black copper oxide with an excess of phthalic acid, over that required to react with all the copper oxide, in the presence of mother liquor from a previous reaction of the copper oxide and phthalic acid containing unreacted phthalic acid and a small quantity of copper phthalate, separating the copper phthalate, adding sodium chlorate to oxidize iron in the mother liquor, separating the impurities and reusing the purified liquor in a subsequent reaction.

9. A method of producing copper phthalate comprising heating copper oxide with phthalic acid in the presence of mother liquor from a previous reaction containing a small amount of copper phthalate an excess of phthalic acid over that required for the reaction with all the copper oxide, separating the copper phthalate, cooling the mother liquor to crystallize phthalic acid and acid copper phthalate, separating the crystals and oxidizing the remaining liquor to precipitate iron compounds, removing the precipitate, combining the liquor with the said crystals and reusing the resulting purified liquor in a subsequent reaction.

SIDNEY B. TUWINER.
DWIGHT A. DODGE.

CERTIFICATE OF CORRECTION.

Patent No. 2,301,762.  November 10, 1942.

SIDNEY B. TUWINER, ET AL.

It is hereby certified that error appears in the printed specification of the above numbered patent requiring correction as follows: Page 2, second column, lines 62, 63 and 64, claim 2, for "heating a suspension of copper oxide in a solution in liquid solvent of the" read --heating copper oxide with the--; and that the said Letters Patent should be read with this correction therein that the same may conform to the record of the case in the Patent Office.

Signed and sealed this 5th day of January, A. D. 1943.

(Seal)

Henry Van Arsdale,
Acting Commissioner of Patents.